May 5, 1942.  R. H. TALBOT  2,282,009

MANUFACTURE OF VINYL RESIN FILM AND SHEETING

Filed Dec. 9, 1939

RALPH H. TALBOT
INVENTOR

BY
ATTORNEYS

Patented May 5, 1942

2,282,009

UNITED STATES PATENT OFFICE 2,282,009

MANUFACTURE OF VINYL RESIN FILM AND SHEETING

Ralph H. Talbot, Rochester, N. Y., assignor to Eastman Kodak Company, Rochester, N. Y., a corporation of New Jersey Application December 9, 1939, Serial No. 308,502

2 Claims. (Cl. 18—57)

This invention relates to the production of film, sheeting, and other attenuated products from vinyl and similar synthetic resins, and more particularly to a method of facilitating the removal of such products from surfaces upon which they have been formed.

In recent years, research carried on in connection with the production and use of vinyl resins has demonstrated that certain of these materials, particularly the acetals derived by condensing various aldehydes with polyvinyl alcohols or partially hydrolyzed polyvinyl esters may be employed satisfactorily in the manufacture of photographic film base, sheeting and other attenuated products. In general, it may be said that such resins are susceptible of being cast or extruded by a procedure analogous to that employed in the manufacture of film and sheeting from cellulose derivatives. However, due to their peculiar physical and chemical characteristics, particularly their inherent tendency to adhere to surfaces upon which they are cast from solution and their tendency to stretch when subjected to relatively slight tension at moderately elevated temperature, and/or when containing even small amounts of solvent, many unusual and difficult problems are encountered when one attempts to apply known film-forming technique, as practiced in the cellulose derivative industry, to these resinous materials.

One of the most serious problems encountered in the manufacture of these resin films and sheetings by the customary wheel casting method is to bring the cast layer of resin into such a condition that it can be satisfactorily stripped from the film-forming surface. Vinyl resin films and sheetings are particularly difficult to strip without injury to the product. In the first place, under moderately elevated temperatures the material tends to adhere more firmly to the casting surface, particularly if the surface is of metal, and thus requires considerably more tension for its removal than is the case with cellulose derivatives. In the second place, this tension must be applied at a time when the resin layer contains a fairly considerable amount of solvent and is thus very elastic and in a particularly stretchy condition. The degree of stretch is also much higher in such films than in the case of the cellulose derivatives. For example, whereas a cellulose derivative film will be stretched, under ordinary circumstances, only a few per cent at stripping, a vinyl resin film, on the other hand, may stretch several hundred per cent under the same or comparable conditions. Not only does this excessive stretch present many difficulties in the handling of the material during the subsequent curing operations, but it also has a tendency to adversely affect the quality of the finished product.

This invention has as its principal object to provide a method of manufacturing vinyl resin films, particularly those of the acetal type, in which the film is brought to a condition in which it may be satisfactorily stripped from its film-forming surface under substantially the same conditions of temperature and tension as are now customarily employed in processes for the manufacture of film and sheeting from cellulose derivative materials. Another object is to provide a means of facilitating the removal of vinyl resin films or sheets from a film-forming surface and under minimum tension. A further object is to provide a method of making vinyl resin film and sheeting in which the material is not subjected to excessive stretching at the point of stripping. Other objects will appear hereinafter.

These objects are accomplished by the following invention which, in its broader aspects, comprises the deposition of a solution of an appropriate vinyl or other synthetic resin on a film-forming surface, removing part of the solvent from the material, subjecting the material to the action of an atmosphere of high relative humidity, and stripping the material from the film-forming surface. The resin solution may be conveniently deposited on the surface of a slowly rotating wheel or drum mounted in an appropriate wheel casing or other confined space in which provision is made for subjecting the film material during at least part of the curing stage to an atmosphere of high relative humidity. One convenient method to obtain the desired degree of humidity is to add water vapor or steam in a predetermined quantity to the current of heated air which is normally employed to remove solvents from the film material.

I have found that when a vinyl or similar synthetic resin film is subjected, particularly during the later stages of solvent removal (i. e., after removal of the major portion of the solvent) to the action of steam, that is, a body of air having a high relative humidity, the resinous material, notwithstanding its inherent and extreme tendency to stick to the film-forming surface may be caused substantially completely to lose this tendency. In fact, by employing steam in the manner more particularly described hereinafter, the bonding forces operating at the interface between the under surface of the film and the film-forming surface are so dissipated that the film material will actually float free from the surface without the application of appreciable tension. This remarkable and unexpected result provides a means whereby such films may be brought into a condition in which they can be stripped without the development of snap lines, undue stretch or other mechanical defects.

In the following examples and description, I have set forth several of the preferred embodiments of my invention, but they are included merely for purposes of illustration and are not to be regarded as limitations thereof.

Figure 1:
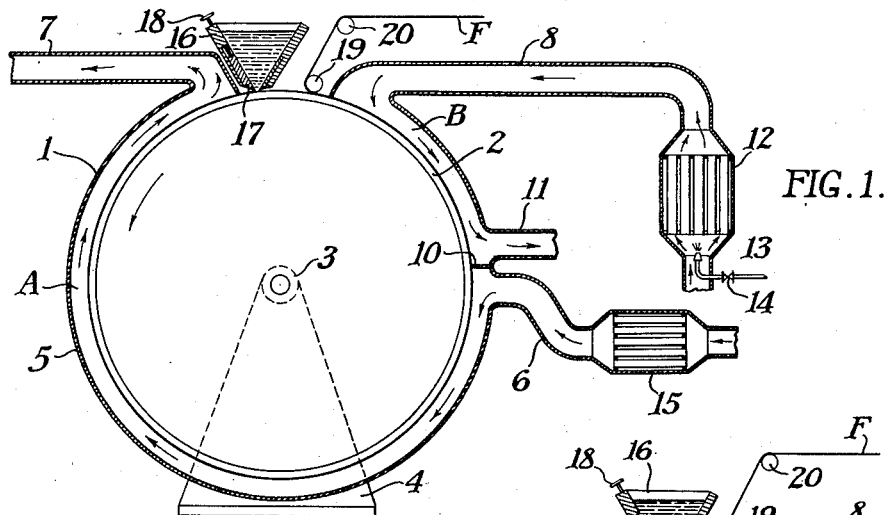
Fig. 1 is a diagrammatic elevational sectional view of one type of apparatus by which my invention may be carried out and illustrating the preferred method of subjecting the film to the action of steam or an atmosphere of high relative humidity.

Referring to Fig. 1, the numeral 1 designates a conventional type of film-forming apparatus comprising the casting or coating wheel 2 mounted in suitable bearings 3. The wheel assembly is mounted on base 4 and is surrounded by wheel casing 5 which is provided with a main air inlet conduit 6 and an air outlet conduit 7. The numeral 8 indicates an additional inlet conduit for supplying heated air to a chamber B segregated from the main part of the wheel housing 5 by means of baffle or partition 10, the lower end of which extends into close proximity with the surface of the wheel, yet is separated therefrom by a distance sufficient to permit the film to pass thereunder without contact. Numeral 11 designates an outlet conduit for conducting away the air after its passage through chamber B. Air passing into conduit 8 is heated by means of heater 12 and is also given the desired degree of humidity by means of steam admitted through valve 14 to jet 13 positioned within the conduit supplying air to heater 12.

The numeral 15 designates a conventional heating unit similar to heater 12 for supplying heat to a current of unhumidified air passing into the left hand compartment A of the wheel casing through inlet conduit 6, and out through conduit 7. As shown, this current of air, which is the main air current in the wheel casing, is segregated from the humidified current of air admitted at the last portion of travel of the wheel before the latter returns to the point at which the film-forming solution is deposited.

Numeral 16 designates a conventional type of dope hopper provided with adjustable gate member 17 for regulating the thickness of the dope stream which flows therefrom, adjustment being made by means of thumb screw 18 attached in known manner to the gate member and threaded through one wall of the hopper. Numeral 19 designates a conventional type of stripping roll, while numeral 20 is a guide roll for conveying the film F to any desired further treatment steps, such as air curing, annealing, subbing, or other operation.

The operation of the device will be apparent on inspection. A solution of an appropriate synthetic resin in a volatile solvent is placed in the hopper 16 where it is maintained at an appropriate temperature. As the wheel 2 rotates slowly in the direction indicated by the arrow thereon, the resin solution is fed from the hopper 16 to the surface of the wheel. The thickness of the dope stream is regulated by adjustment of the gate member 17 to give a film of appropriate eventual thickness, say of the order of .005 inch.

As the wheel 2 rotates, it carries the deposited layer of film material countercurrently to the current of air passing into the wheel casing from conduit 6. As soon as the film material is deposited on the wheel surface, it immediately commences to lose solvent under the influence of the air current. As the solvent is removed, the film solidifies and tends to cling more and more tenaciously to the film-forming surface. As it passes the baffle 10, in accordance with my invention, it meets a second, segregated current of air having a relatively high humidity. This humidifying or steam treatment serves almost instantaneously to dissipate the bonding forces at the interface between the undersurface of the film and the film-forming surface which otherwise would cause the film to cling tenaciously to the surface and prevent its removal therefrom. By the time the film has passed to the stripping roll 19 it is found to be in a condition in which it can be readily removed from the film-forming surface under a minimum of tension and, in any event, without the production of snap lines, undue stretch or other physical defects.

In carrying out the process, the casting wheel may be heated to an appropriate temperature by heat acquired from the air current or otherwise. The actual temperature employed will depend, not only upon the particular resin employed in the dope, but also upon the boiling point of the solvent or solvents employed. The practical upper limit of temperature will be in the vicinity of, or somewhat below, the boiling point of the solvent, since if the temperature is raised to or above the boiling point, the solvent will bubble and thus produce optical defects in the body of the film.

Depending upon the type of film material being treated and various other factors, the wheel itself may be internally heated, if desired, although this is generally to be avoided because of the tendency of the resinous material thus to become plastic and adherent.

Figure 2:
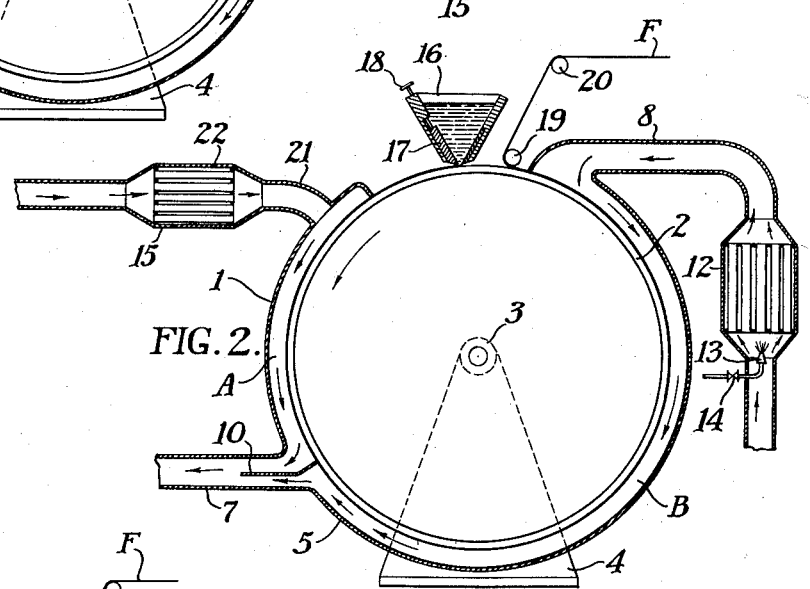
Fig. 2 is a view similar to Fig. 1 illustrating a slightly modified apparatus and procedure whereby the film material is given a slightly more extensive treatment.

Referring to Fig. 2, in which like numerals designate like parts as in Fig. 1, numeral 13 designates a steam jet controlled by valve 14 for supplying the desired degree of humidity to the current of air, heated by means of a heater 12, which is conducted into the wheel casing by means of inlet conduit 8. After flowing around about ⅔ of the circumference of the wheel as indicated by the arrows, the air current finally impinges upon baffle 10 so placed as to divide the wheel casing into separate compartments A and B, and thence into air outlet conduit 7.

Numeral 21 designates a second air inlet conduit for supplying dry air heated by means of heater 22 to compartment A of the wheel casing. This current of air moves circumferentially in a direction opposite to the current of air supplied through conduit 8 and impinges upon the opposite side of the baffle 10 and thence passes into the common outlet conduit 7.

As will be readily observed, the film material in this form of the invention is subjected to the action of steam or an atmosphere of high relative humidity for approximately ⅔ of its travel from the deposition point to the stripping point.

Figure 3:
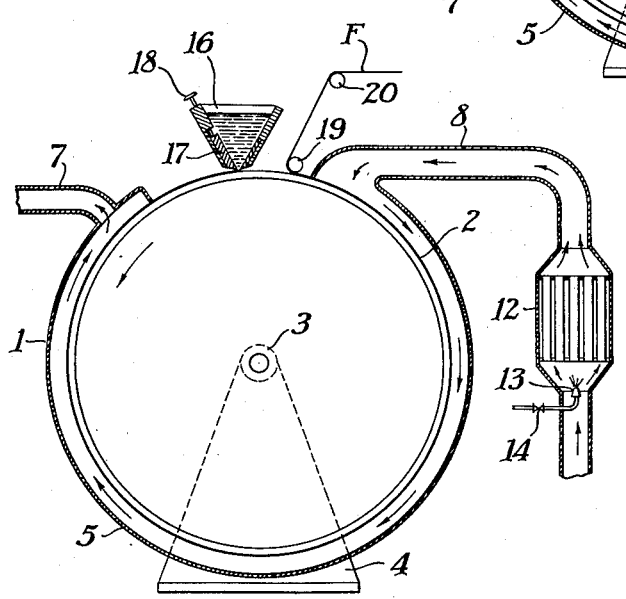
Fig. 3 is a view similar to Figs. 1 and 2 and illustrating a method and apparatus for giving the film material an even more drastic treatment than that of Figs. 1 and 2.

Referring to Fig. 3, in which like numerals also refer to like parts, the numerals 12 and 13 designate humidifying and heating apparatus similar to those of Figure 2. In the device illustrated in Fig. 3, no provision is made for dividing the interior of the wheel casing into compartments, the heated and humidified air passing into contact with the film material in the vicinity of the point of stripping and passing countercurrently around the wheel housing to a point somewhat removed from the point of deposition of the film-forming solution and then out of the apparatus via conduit 7.

The film in this form of the invention is thus subjected during approximately the whole of its travel from the point of deposition to the point of stripping to the action of humidified air. The results obtained are substantially the same as those obtained by use of the form of casing shown in Figs. 1 and 2. It may, however, be necessary to exercise a slightly more exact degree of control over the various conditions of operation, such as wheel speed, air temperatures, amount of moisture admitted and various other factors in order to preclude the possibility of the film being subjected to too severe action, especially during that portion of its run in which it contains a relatively large amount of solvent, as otherwise the film displays a tendency to become rubbery and acquire other undesirable physical defects which would render it unfit for use for photographic and other purposes.

In general, it is preferable when subjecting the film during the longer periods of travel in the wheel casing as indicated in Figs. 2 and 3 to employ an amount of moisture in the circulated air which is proportionately less than that employed when the application of moisture is confined to the vicinity of the stripping point as indicated in Fig. 1. For example, when steam is confined to approximately the last portion of the run of the film, the amount of moisture employed may for a given film material and speed range from about 100 grains of water vapor per pound of air to saturation at the temperature in question. In applying the humidified air to a larger portion of the run, say about ⅔ of the run, the amount of steam will range from approximately 100 grains per pound of dry air to somewhat less than saturation. In the case of application to approximately the full run of the film, the amount of moisture will be correspondingly less, say from 100 to about 250 grains of water vapor per pound of air. In each instance the figures just given represent approximate humidity ranges for typical films composed of resins of the type referred to above, that is, resins which have the property of adhering to a surface upon which they are cast from solution. Obviously no hard and fast rule can be laid down with respect to the amount of moisture employed, as this will vary, not only with the film material itself, but also with the solvents employed, casting speed, temperature, and other conditions of the film-forming process. An illustrative range is 100-200 grains of moisture per pound of air in a typical case.

The following examples will further illustrate the carrying out of typical film-forming processes in accordance with my invention.

Example 1

A vinyl mixed acetal resin having an apparent vinyl acetate content of about 4.6% by weight and an apparent polyvinyl alcohol content of 8.6% by weight, the remainder being made up of the polyvinyl acetals of butyraldehyde and acetaldehyde, the aldehydes of which are in the ratio of approximately 30 mols of butyraldehyde to 70 mols of acetaldehyde, which resin may be prepared in accordance with the disclosure of my U. S. Patent 2,129,450, was dissolved in a solvent composed of 90% by weight of acetone and 10% by weight of methyl alcohol, the solvent-to-resin ratio being 3.25:1 by weight. This solution, after filtering and heating for a few hours at a sufficiently elevated temperature to free the material from bubbles, was deposited in the form of a film on the surface of a casting wheel such as illustrated in Fig. 1 of the drawing. The temperature of the solution in the coating hopper was maintained at about 103° F., and the inlet air temperature at a temperature of 95° F. The wheel was rotated at such speed that the film material remained on the casting surface for 15 to 20 minutes. As the wheel rotated solvents were cured from the film under the influence of dry air admitted to the casing. The film at the stripping point could be removed from the coating surface only by extreme tension. This produced stretching of the film and a surface strain which appeared in the form of lines running perpendicularly to the direction of stripping and gave an iridescent appearance to the film.

Furthermore, stripping under such conditions of extreme tension produces a film which tends to be strained in the direction of stripping. This in turn causes dimensional changes in the finished film which are undesirable, particularly from the photographic standpoint. The presence of cross lines is also objectionable, since it necessitates a subsequent treatment to remove them.

In accordance with my invention, when the humidity of the air admitted to approximately the last ¼ of the wheel casing was given a value of about 100 grains of moisture per pound of dry air, the film could be readily removed from the casting surface free from the above-mentioned strain lines and other mechanical defects. When the humidity was increased to a value corresponding to 200 grains of moisture per pound of dry air, the film material floated freely from the wheel surface without tension. As before, the strain lines and other mechanical defects were entirely absent from the product.

Example 2

A polyvinyl acetal resin such as described in U. S. Reissue Patent 20,430, having an apparent polyvinyl acetate content of 3% and an apparent polyvinyl alcohol content of 8.3%, the remainder being made up of divinyl acetal, was dissolved in a solvent consisting of 90 parts by weight of acetone and 10 parts by weight of methyl alcohol in a solvent-to-resin ratio of 3.8:1. After filtering and freeing from bubbles, the temperature of the solution was raised to 100° F., and flowed from the hopper of a device such as illustrated in Fig. 2 onto the surface of the casting wheel which was maintained at a temperature of about 90° F. When employing dry air, difficulties similar to those described in Example 1 were experienced. Upon applying air having an absolute humidity corresponding to about 125 grains of moisture per pound of air for about two thirds of the run of the film in the wheel casing, completely satisfactory stripping of the film material was obtained, the casting period being the same as in Example 1.

Example 3

A formacetal resin having an apparent vinyl acetate content of about 3.4% by weight and an apparent polyvinyl alcohol content of about 6.4% by weight, the remainder being made up of the polyvinyl acetals of formaldehyde and acetaldehyde, the aldehydes of which are in the ratio of approximately 20 mols of formaldehyde to 80 mols of acetaldehyde, the preparation of which type of resins is described in U. S. Patent 2,116,635, was dissolved in a solvent consisting of 90 parts of acetone and 10 parts of methyl alcohol in a solvent to resin ratio of 4 to 1, filtered, freed from bubbles, and flowed from the hopper of a device such as illustrated in Fig. 3 at a temperature of 97° F. onto a wheel surface having a temperature of 90° F. The wheel was operated at such a speed that the film remained on the film-forming surface approximately 15 minutes. After adjustment of the humidity conditions of the inlet air (heated to a temperature of 150° F.), to a value corresponding to 138–180 grains of moisture per pound of dry air, this humidified air was admitted to substantially the whole run of the film in the casing, with the result that the film could be easily removed from the film-forming surface at the stripping point without any of the above-mentioned mechanical defects and with no or very little tension.

In those cases in which the film material tends to turn white or become hazy under the effect of the moisture, such a defect may be eliminated by treating the film material with a solvent wash composed of solvents of the film material, preferably diluted by a non-solvent to the point where the treating liquid will not have an especially drastic action on the film material, or by passing the film after stripping between moderately heated rolls.

Although, in accordance with the broad principles of my invention, I may apply steam, that is, humidified air, to a distance ranging from approximately ¼ or less of the run of the film to nearly its entire run with satisfactory results, I prefer to employ that embodiment of my invention in which the supply of steam or humidified air is confined to the general locality of the stripping point of the film or at least to the last part of the run of the film. It is of course to be assumed that the travel and speed of the film on the wheel surface or equivalent film-forming surface is of sufficient length to give the desired degree of curing, that is, that sufficient time be permitted for a proper removal of solvents from the film material. Obviously, this may be accomplished, either by employing a wheel of large diameter operated at a relatively high peripheral speed or by means of a wheel of smaller diameter rotated at a proportionately lower speed. The important point is that, in accordance with my invention, satisfactory results may be obtained regardless of whether the humidified air is applied to the film in the general locality of the point of stripping, for the extent of the run of the film less than its whole length, or for substantially all of the run of the film between the point of deposition and the point of stripping.

As to the matter of residual solvent which the film may contain at stripping, this will depend on the particular resin dealt with, the solvents employed, the time the film remains on the casting surface, and various other factors. In general at least the major portion of the solvent should be removed in order that the film may be stripped without appreciable tension under the conditions set forth above. In most cases, I prefer to reduce the solvent (total volatile) to a value corresponding to about 20%, based on the total weight of the film at stripping.

While my invention is designed to be applied with success to any type of synthetic resin which, when cast from solution on a film-forming surface, has a pronounced tendency to adhere strongly to such surface, it has particular value in facilitating the removal from casting surfaces of resins such as those described in the Matheson U. S. Patent 2,116,635, in Morrison et al. U. S. Reissue patent 20,430, and Talbot patent 2,129,450, in which the property of adherence is exceptionally pronounced.

At this point it should be noted that my invention is clearly to be distinguished from processes of the prior art in which cellulose derivatives or other types of sheeting are subjected to the action of steam or humidified air for the purpose of facilitating the curing of solvents therefrom or for similar purposes. The present invention has nothing whatever to do with curing, except as this may be co-incidental with the procedure employed. On the contrary, my invention is confined strictly to facilitating the removal of a vinyl resin or other type of synthetic resin film from a film-forming surface upon which it has been cast from solution. The invention is of particular value in facilitating the removal of films composed of a material which has an inherent tendency to cling tenaciously to such surfaces and which is, under the conditions ordinarily employed in film manufacture, utterly impossible to remove from these surfaces without the production of snap lines, undue stretch and other mechanical defects.

What I claim is:

1. The method of facilitating the removal of a vinyl resin film from a surface upon which it has been cast from solution and to which it normally adheres tenaciously, which comprises removing the major portion of the solvent therefrom by means of substantially dry air and thereafter subjecting the free surface of the film while the film is in close contact with the film-forming surface to the action of an atmosphere having an absolute humidity ranging from 100 grains of moisture per pound of dry air to an amount of moisture corresponding to a value just below the saturation point of the air.

2. The method of facilitating the removal of a vinyl resin film from a surface upon which it has been cast from solution and to which it normally adheres tenaciously, which comprises removing the major portion of the solvent therefrom by means of substantially dry air and thereafter subjecting the free surface of the film in the approximate vicinity of the stripping point and while the film is in close contact with the film-forming surface, to the action of an atmosphere having an absolute humidity ranging from 100 grains of moisture per pound of dry air to an amount of moisture corresponding to a value just below the saturation point of the air.

RALPH H. TALBOT.